April 17, 1962 W. C. YESCHICK 3,029,439
SUN VISOR
Filed Oct. 17, 1960

INVENTOR.
WILLIAM YESCHICK

United States Patent Office 3,029,439
Patented Apr. 17, 1962

3,029,439
SUN VISOR
William C. Yeschick, 4410 Warner Road, Cleveland, Ohio
Filed Oct. 17, 1960, Ser. No. 62,993
2 Claims. (Cl. 2—12)

This invention relates generally to headdress, and specifically to improvements in sun visor construction.

There are presently several types of headdress on the market that incorporate a sun visor for protecting the eyes from the sun. Such apparel is usually quite complex in construction and must be made in different sizes so as to fit the several sizes of head. The size restriction imposed by the cap portion of the visor prevent communal use of same. A second disadvantage to be found in known visor headdress lies in the fact that the cap portion itself can cause discomfort and perspiration due to the lack of ventilation afforded to the head. I believe that a considerably improved and more versatile visor structure is possible, and it is to this end that my invention is directed.

It is a primary object of this invention to provide a sun visor which may be simply adjused to fit any size of head, and which does not require the conventional cap structure for supporting the same on the head of the wearer.

It is a further object of this invention to provide a sun visor structure which comprises a minimum number of parts, is long wearing, comfortable and attractive.

It is a still further object of this invention to provide a sun visor structure of the above class which may be formed in one operation, enabling manufacture at extremely low cost.

The invention consists of a forehead embracing rib which terminates at each end with clasp strips for grippingly engaging the sides of the temples above the ears. The rib and strips may be formed of plastic and receive a spring wire core throughout their length. Extending outwardly from the rib is an arcuately formed visor having a curved peripheral edge. The concave forehead engaging portion of the visor curves downwardly to form the support rib adapted to embrace the forehead and maintain the visor in a fixed downwardly sloping angle relative to the plane formed by the rib.

Further objects and advantages of this invention will become apparent from the following more detailed description of a preferred embodiment thereof, taken in conjunction with the attached drawings wherein.

Similar reference characters indicate corresponding parts throughout the several views in the drawing.

Figure 1:
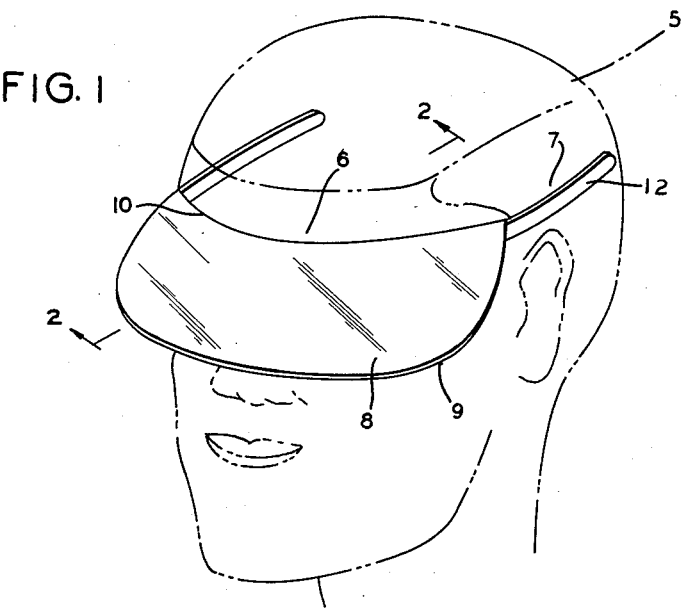
FIG. 1 is a perspective view showing the visor which comprises my invention secured about the temples of the wearer.
Figure 2:
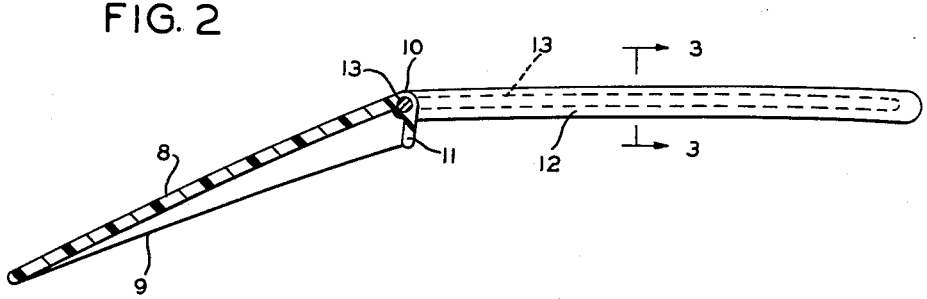
FIG. 2 is a cross sectional side elevation of the visor taken along the line 2—2 of FIG. 1.
Figure 3:
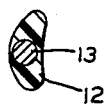
FIG. 3 is a fragmentary cross sectional view taken along the line 3—3 of FIG. 2.

Referring now to the drawings in detail, the numeral 5 represents the human head and includes a forehead 6 and a side temple area 7.

The visor comprises an arcuately curved eye shade 8 which has a forwardly curved peripheral edge 9. The shade is curved at its rear edge 10 for engagement with the forehead 6. The rear edge is further turned downwardly to form a support rib 11 which extends at an acute angle with respect to the shade and locates against the forehead to hold the shade at a pre-set angle relative to the wearer. The rib extends beyond opposite ends of the shade to form curved clasp strips 12 of shorter depth than the rib. The curvature formed by the rib is extended into the strip portions 12 which terminate towards the rear of opposite sides of the head.

Formed integrally with the support rib and the extending clasp strips is a tempered wire 13 which is adapted to brace the rib and depending strips so that the strips are urged inwardly towards each other for engaging along each side of the head, thereby securing the shade in position about the forehead.

The completed visor is adjustable since the clasp strips may be forced inwardly or outwardly to suit and fit the wearer. It will also be appreciated that the visor is designed such that it can be simply molded in one operation from a two part die, making the manufacturing cost of the article exceedingly low. By my invention, it is now possible to enjoy the comfort of a sun visor without the accompanying discomfort of heat and perspiration which can be attributed to the cap portion of presently available visor headgear. By constructing the visor from one piece of molded plastic, containing a curved length of spring steel within the head embracing portions, I have overcome the need for a cap portion to hold the visor in position.

Having described the invention in a preferred form, it will be appreciated that some modifications may be made to the precise configuration, without departing from the scope or spirit of the invention, as defined by the following claims.

I claim:
1. A sun visor comprising, an arcuately curved shade having a rear edge adapted to embrace across the forehead of a wearer, said shade with said sun visor in position upon the wearer's forehead projecting forwardly and downwardly relative to the forehead, said rear edge extending downwardly to form a rigidly related support rib for supporting the shade, said rib being molded in unison with the shade and extending at each end to form flat elongated clasp strips adapted to adjustably engage along opposite sides of the head so as to retain the support rib in engagement with the forehead, such that the shade projects forwardly and downwardly relative to the forehead.

2. A sun visor according to claim 1 wherein a tempered wire is integrally formed to extend inwardly along the length of said rear edge and each of said clasp strips.

References Cited in the file of this patent
UNITED STATES PATENTS
| | | |
|---|---|---|
| 1,980,101 | Schmeider | Nov. 6, 1934 |
| 2,870,446 | Mitchell | Jan. 27, 1959 |

FOREIGN PATENTS
| | | |
|---|---|---|
| 233,480 | Great Britain | May 14, 1925 |
| 1,005,015 | France | Dec. 5, 1951 |
| 1,045,930 | France | July 1, 1953 |